No. 678,306. Patented July 9, 1901.
G. N. SAEGMULLER.
COMPOUND LENS.
(Application filed Feb. 28, 1901.)
(No Model.)
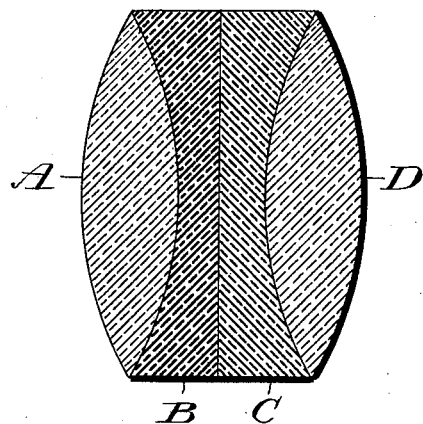
Witnesses
Wm. F. Doyle.
Alfred T. Gage.
Inventor:
George N. Saegmuller,
By E. B. Stocking
Attorney
THE NORRIS PETERS CO., PHOTO-LITHO., WASHINGTON, D. C.

UNITED STATES PATENT OFFICE.

GEORGE N. SAEGMULLER, OF WASHINGTON, DISTRICT OF COLUMBIA.

COMPOUND LENS.

SPECIFICATION forming part of Letters Patent No. 678,306, dated July 9, 1901.

Application filed February 28, 1901. Serial No. 49,321. (No model.)

*To all whom it may concern:*

Be it known that I, GEORGE N. SAEGMULLER, a citizen of the United States, residing at Washington, in the District of Columbia, have invented certain new and useful Improvements in Compound Lenses, of which the following is a specification, reference being had therein to the accompanying drawing.

My invention relates to improvements in the construction of object-glasses for telescopes, range-finders, and other visual instruments; and the purpose in view is to enlarge the field of view while maintaining a restricted or not enlarged size in the apparatus or instrument in which the invention is employed.

To this end my invention consists of an object-glass constructed as hereinafter described, and particularly pointed out in the appended claims.

Referring to the drawing, A is a biconvex lens which constitutes the outer member of a compound objective or object glass. By "outer member" I mean the one nearest the object being observed.

B represents one of two intermediate plano-concave lenses, C the other plano-concave intermediate, and D the inner biconvex member of the compound objective. By "inner" I mean the member nearest the eye of the observer.

The individual member A is of flint-glass and has a refractive index of 1.61, the member B is of manganese crown-glass and has a refractive index of 1.49, the member C is of borax crown-glass and has a refractive index of 1.48, and the member D is of flint-glass and has a refractive index of 1.59.

It is apparent to persons skilled in the art that the specific refractive indices of the members may be varied, provided the indices are of substantially the same relation, and that the particular material or character of the glass from which they are formed may be varied, so as to secure equivalent results in the refractive action of such members; but I deem it preferable that the outer and inner members A and B be formed of flint-glass.

A compound lens comprising the arrangement of individual members of the character described gives a largely-increased field, very fair definition, and practically absence of color or chromatic aberration, while the telescope as a whole is of such limited dimensions as very aptly fits it for use in range-finders and other visual apparatuses which have heretofore required much more space for use and storage.

What I claim is—

1. A lens comprising four individual members, the outer biconvex members having differing refractive indices and the inner plano-concave members having relatively differing refractive indices which are less than those of the outer members; substantially as specified.

2. A compound lens comprising four individual members, the outer member having the greatest relative refractive index, the inner member having a lesser refractive index than the outer member, the intermediate member adjacent to the outer member refracting outwardly from its axis and having a refractive index less than said outer member, and the remaining intermediate member refracting outwardly from its axis and having a refractive index less than the adjacent intermediate member and less than that of the inner member; substantially as specified.

In testimony whereof I affix my signature in presence of two witnesses.

GEO. N. SAEGMULLER.

Witnesses:
 ALFRED T. GAGE,
 GEORGE M. BOND.